United States Patent
Hardy

[15] 3,693,996
[45] Sept. 26, 1972

[54] PORTABLE HAND TRUCK
[72] Inventor: Joseph Hardy, 7335 S. Cottage Grove Ave., Chicago, Ill. 60619
[22] Filed: May 13, 1970
[21] Appl. No.: 36,712

[52] U.S. Cl. .............................. 280/47.34, 289/79.3
[51] Int. Cl. .............................................. B62b 3/00
[58] Field of Search ........ 280/36, 36 C, 41, 41 C, 43, 280/47.2, 47.21, 47.34, 47.41, 47.37, 79.1, 47.33

[56] References Cited

UNITED STATES PATENTS

| 908,472 | 1/1909 | Lyons | 280/47.33 UX |
|---|---|---|---|
| 2,612,386 | 9/1952 | Schutzer et al. | 280/41 X |
| 2,638,236 | 5/1953 | Prowinsky et al. | 280/36 C X |
| 2,096,994 | 10/1937 | Millen | 280/47.21 X |
| 2,598,168 | 5/1952 | Houz et al. | 280/36 |
| 2,582,435 | 1/1952 | Howard | 280/36 |
| 1,358,235 | 11/1920 | Nylin | 280/36 X |

Primary Examiner—Leo Friaglia
Assistant Examiner—Robert R. Song
Attorney—Max R. Kraus

[57] ABSTRACT

A hand truck comprising a base carriage having rollers or wheels, a frame pivotally supported on said base carriage at the forward end of the base carriage, the frame having a pair of spaced side members, a cross member slidably supported on said side members, locking means on said cross member and engaging said side members for locking said cross member relative to said side members, and bracing means pivotally connected at one end to said base carriage and connected at its other end to said cross member for supporting said frame in any adjusted upright position, said frame member positionable to a horizontal position so that said hand truck may be used as a flat bed truck or dolly.

3 Claims, 7 Drawing Figures

PATENTED SEP 26 1972 3,693,996

INVENTOR
JOSEPH HARDY

BY
Max R. Kraus
ATTY.

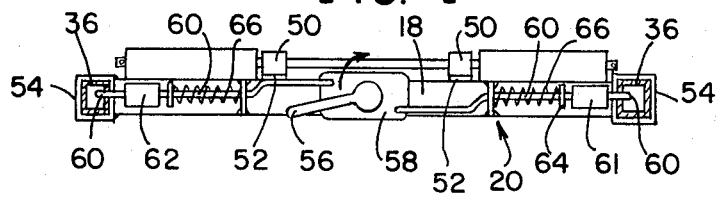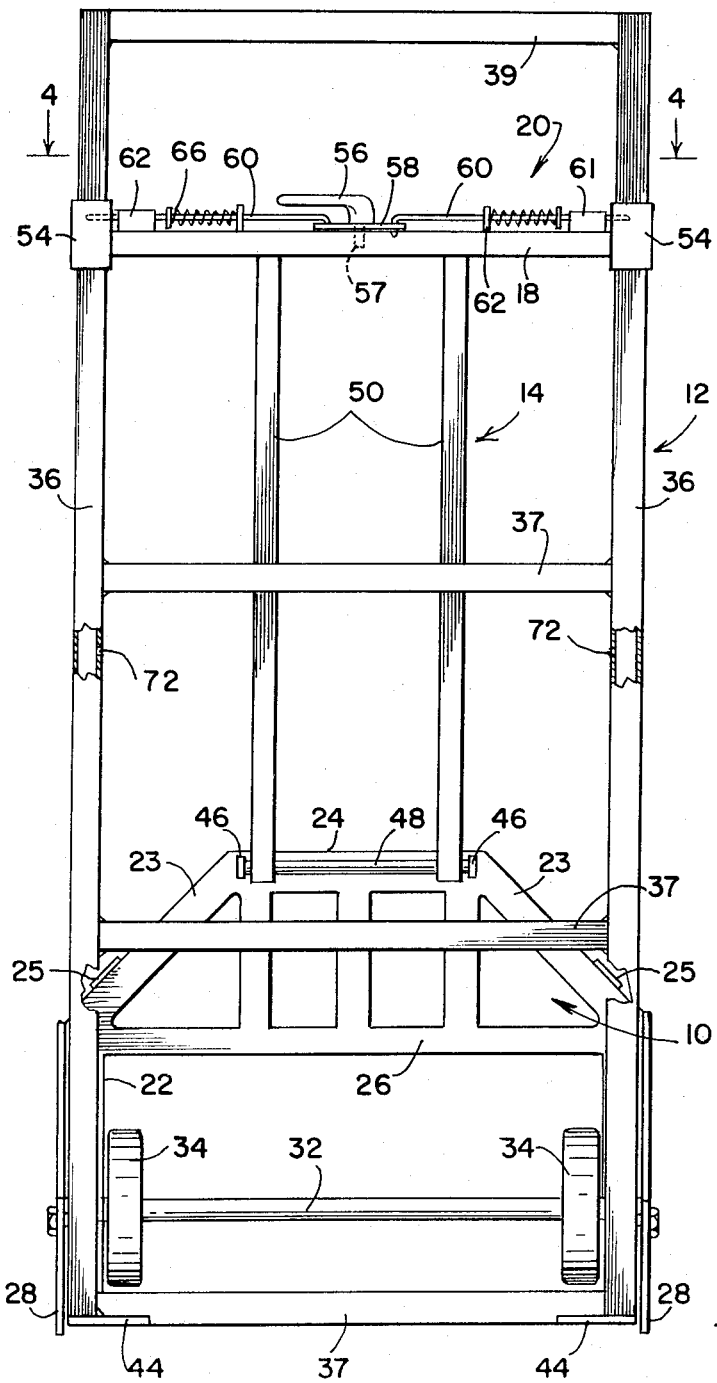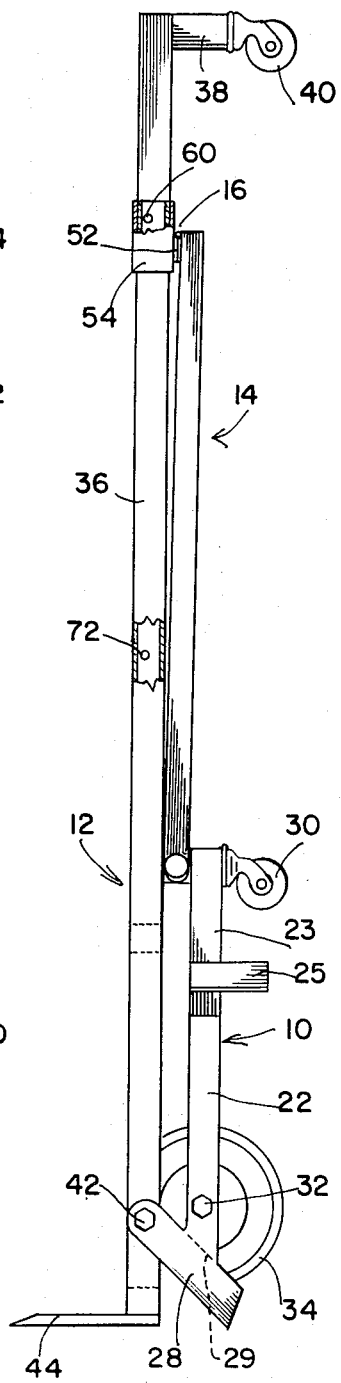

PORTABLE HAND TRUCK

BRIEF SUMMARY OF THE INVENTION

The objectives of this invention are to provide a hand truck with a base carriage and frame member and bracing means whereby the upright position of the frame is adjustable to vary the angular positions, and whereby the load is supported by the bracing means so that the operator does not carry any portion of the load, and whereby the load is properly balanced, and whereby the hand truck is readily converted to a flat bed truck or dolly.

BRIEF DESCRIPTION OF THE DRAWINGS

In the drawings:

FIG. 2 is a front elevational view thereof.

FIG. 3 is a side elevational view positioned as a flat bed truck or dolly, or if positioned in a vertical position, for a store-away position.

FIG. 4 is a plan view taken on line 4—4 of FIG. 2.

The device generally described includes a base carriage generally indicated at 10 which pivotally supports a frame generally indicated at 12. Pivotally secured to the opposite end of the base carriage are bracing means generally indicated at 14, with the opposite end of the bracing member hingedly secured as at 16 to a cross bar generally indicated at 18 which is slidable with respect to the frame 12 and which is locked to the frame in adjusted positions by locking means generally indicated at 20.

Figure 7:
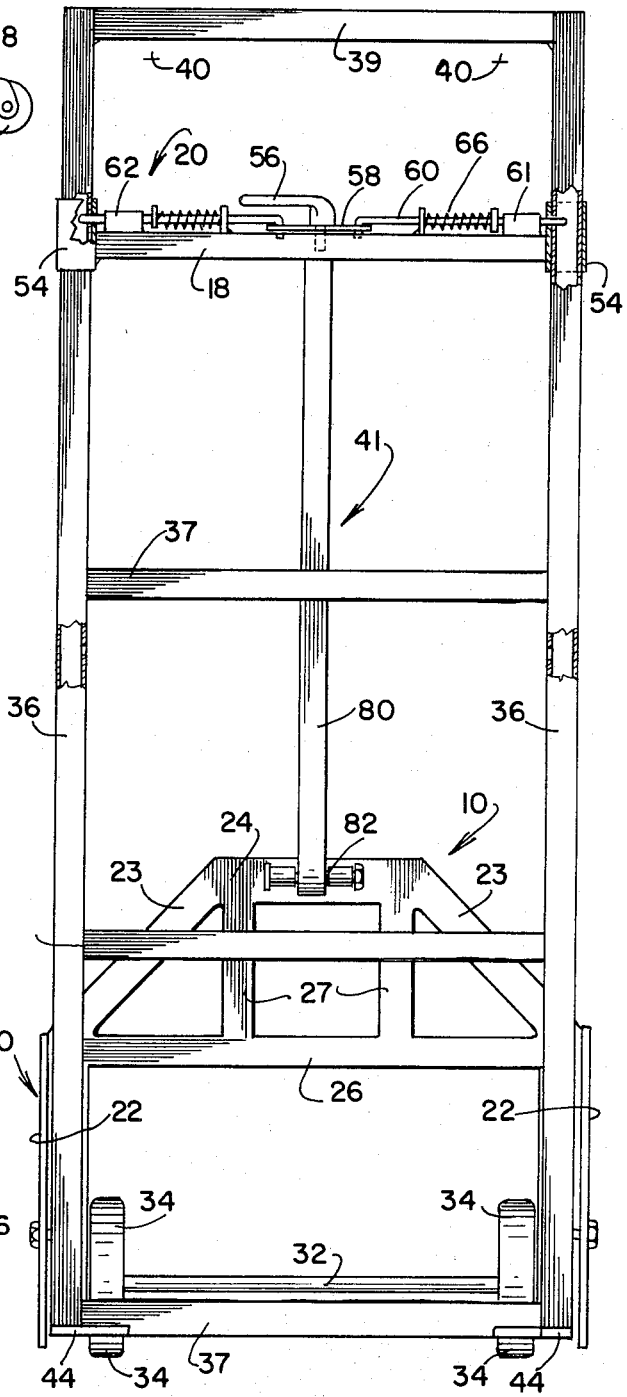
FIG. 7 is a rear elevational view of a modification.

Specifically, the base carriage 10 comprises spaced parallel side members 22 which continue rearwardly as members 23 at an inclined angle and are connected by a cross member 24 at the rear, as best shown in FIG. 7. The members 23 have downwardly extending legs 25 which prevent the base carriage from tipping to either side. An additional cross member 26 and connecting longitudinal members 27 are connected to the base carriage to provide additional strength. The sides 22 of the base carriage extend forwardly and provide extensions 28 which extend at an inclined angle above and below the side members 22. The cross member 24 is centrally recessed as at 24' to accommodate a central swivel roller or caster 30 which is secured to the cross member 24 of the base carriage. The base carriage is provided at the front thereof with an axle 32 which supports a pair of spaced wheels 34.

Inclined stops 29 are provided in the front end of the base carriage adjacent the extensions 28, on the same angle as the extensions 28, which stops are engaged by the lower end of the frame 12 to limit the outward tilting of the frame 12 relative to the base carriage 10. The stops 29 will not prevent the frame from being pivoted to the right, as viewed in FIG. 5, but will prevent further pivoting of the frame to the left, as viewed in said FIG. 5.

The frame generally indicated at 12 includes a pair of spaced side members 36 generally hollow and of rectangular cross section. The spaced side members 36 are connected by a plurality of suitably spaced cross members 37, one of said cross members being at the front end of the frame. The rear end of the frame has side extensions 38 at right angles to the sides 36 connected by a cross member 39 which supports a pair of swivel rollers or casters 40. The cross member 39 may be manually engaged when same is used as a hand truck. The swivel rollers or casters 40 will support the rear end of the frame 12 when in a horizontal position, as in FIG. 3, when same is used as a dolly or flat bed truck.

Figure 1:
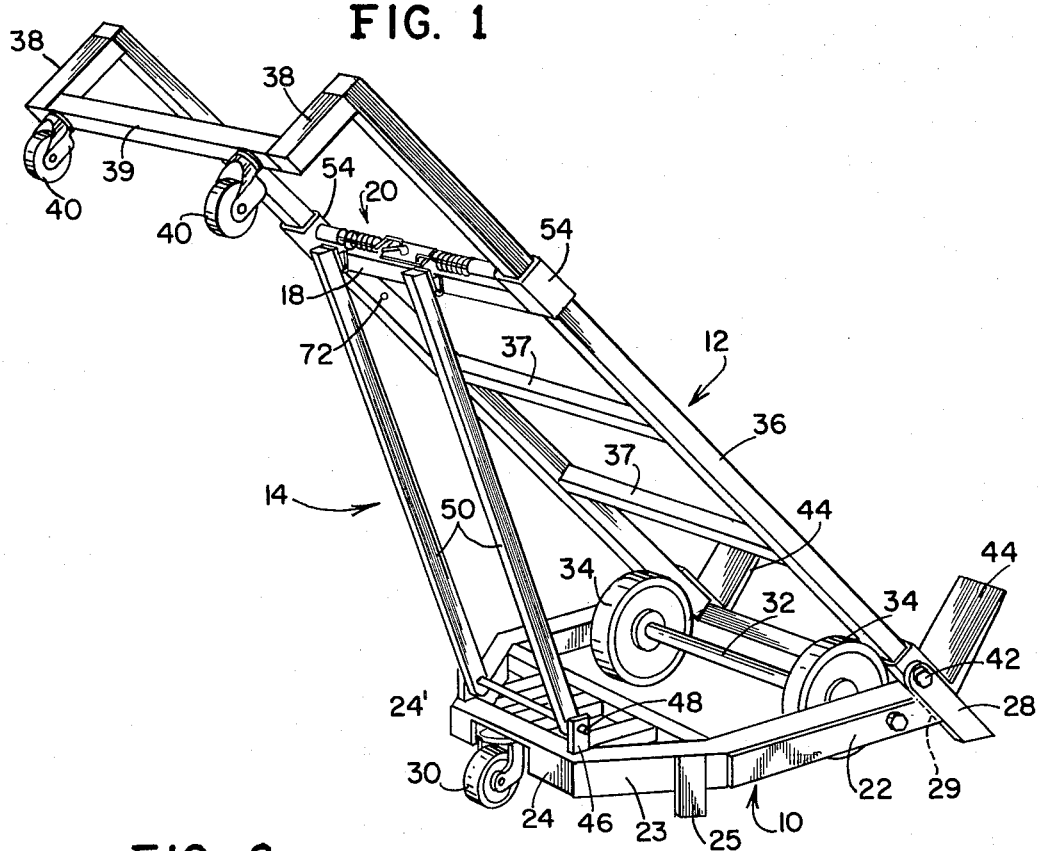
FIG. 1 is a rear perspective view of my invention positioned as a hand truck.
Figure 5:
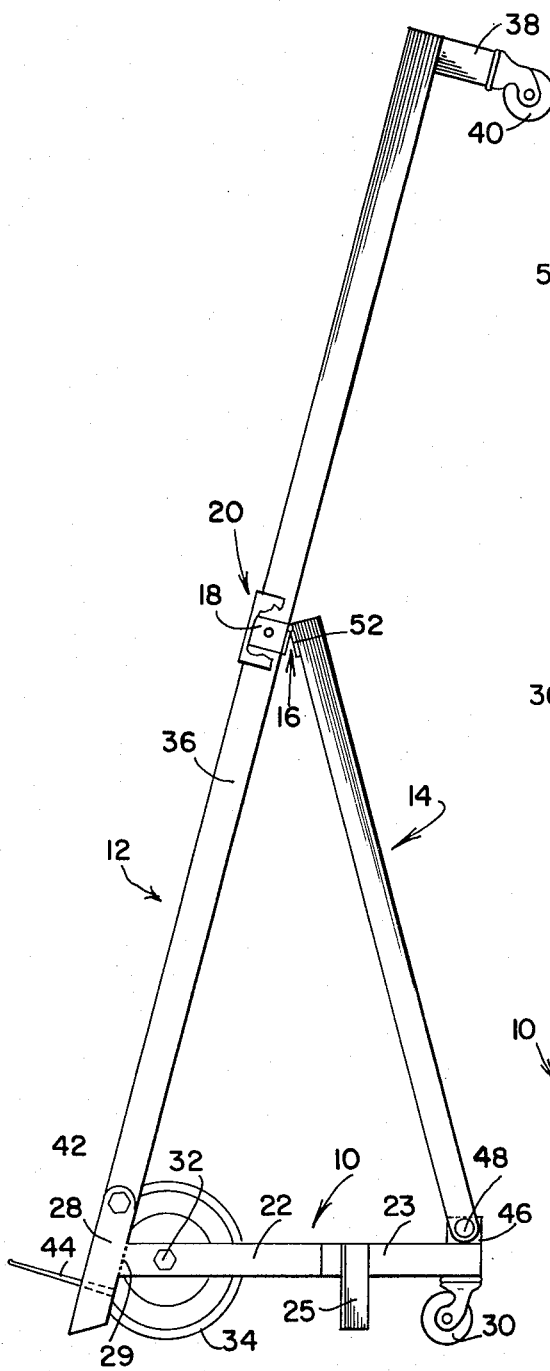
FIG. 5 is a side elevational view of same as a hand truck.

The frame 12 is pivotally connected adjacent its front end to the base carriage 10, i.e., the angled extension 28 of the base carriage 10 is pivotally connected as at 42 to the side members 36 of the frame member to provide the pivotal support of the frame with respect to the base carriage 10. The frame 12 may then be supported on the base carriage at any adjusted inclined angle with respect to the base carriage, such as shown in FIGS. 1 and 5, when used as a hand truck, or the frame may be positioned parallel to the base carriage as in FIG. 3, when same is used as a dolly or flat bed truck or for storage purposes. The front of the frame supports a pair of spaced foot members 44 which support the bottom of the load carried by the frame member.

Extending upwardly of the base carriage 10 are extensions 46 to which are pivotally secured, as at 48, bracing means generally indicated at 14 which comprises a pair of spaced bars 50. The opposite ends of the bracing member are hingedly secured as at 16 by a hinge 52 to the slidable cross member 18.

The cross member 18 has fixed at its opposite ends rectangular shaped sleeves 54 which slidingly engage the side members 36 of the frame 12. The cross member 18 centrally supports a handle 56 which has a pin 57 engaging the cross member 18. A plate 58 is fixedly secured to the pin 57 so that rotation of the handle will rotate the plate 58. A pair of oppositely extending bolts 60 are slidably supported on cross member 18, each by means of a pair of spaced bearing members 61 and 62. Bearing member 62 has a transverse slot 63 therein. A washer 64 is fixed to the bolt 60 and a coil spring 66 extends between the bearing member 62 and the washer 64 to normally maintain the oppositely positioned bolts to their extended positions. The inner ends of the bolts are offset and are secured as at 68 to the plate 58. The sleeves 54 have an opening 70 and the side members 36 of the frame are provided with spaced openings 72 along the length thereof.

Figure 6:
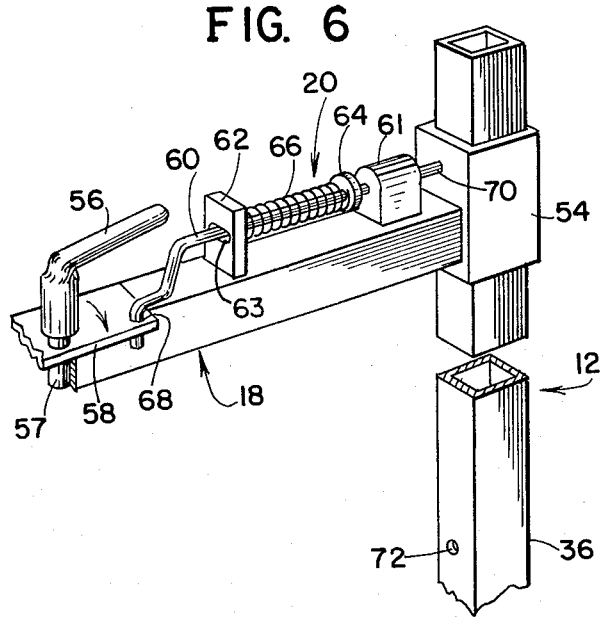
FIG. 6 is an enlarged view of a portion of the latching mechanism.

By rotating the handle 56, the pin 57 will rotate the plate 58, as indicated by the arrow in FIG. 6, to retract the oppositely extending bolts 60 against the compressed coil springs 66 to withdraw the ends of the bolt from the openings 70 and 72 to permit the cross member 18 to be slid relative to the side members 36 of the frame 12. When the desired adjustment has been effected, i.e., when the cross member 18 has been slid on the side members 36 of the frame 12 so that the openings 70 of the sleeves 54 are alined to register with the proper openings 72 in the side members, the handle 56 is rotated in the opposite direction to thereby move the bolts outwardly into engagement with the registering openings 70 and 72 to lock the cross member 18 relative to the frame member. The coil springs 66 will normally maintain the bolts 66 in their extended and locked position until the handle 56 is manually rotated to retract the pins.

By adjusting the cross bar 18 relative to the frame, the angle of the bracing means 14 is changed to properly brace the frame member 12 and the load thereon at the desired angle. The angle can be changed as desired.

The construction shown in FIG. 7 is modified from the foregoing only in respect to the bracing means. Instead of providing a pair of bracing bars like 50, a single bracing bar 80 is centrally positioned and is pivotally secured as at 82 to the base carriage 10, with the upper end of the bracing bar hinged to the cross member 18, as previously described.

As shown in FIGS. 1 and 5, the frame 12 is supported in an inclined upright position, the angle of which may be varied as desired and as previously described. In this position the device may be operated as a hand truck and the load will be fully supported on the base carriage 10 and the bracing means 14 without any part of the load being carried by the operator of the device. The function of the operator is to steer the base carriage and the operator does not carry any of the load. The load is properly balanced and the operator supports none of the load. Even if the frame 12 is positioned in a vertical position the load would not capsize forwardly.

To use the device as a flat dolly, as shown in FIG. 3, the bracing means 14 are positioned horizontally, parallel with the frame 12 and the cross member 18 would be locked to the side members 36 of the frame in this position. The load would then be carried by the wheels 34 and casters 30 and 40. The device may also be stored vertically in this position to occupy a minimum of space.

What is claimed is:

1. A device which can be operated either as a hand truck or as a dolly or flat bed truck comprising, a base carriage having front and rear rollers or wheels which always supports said base carriage in a horizontal position whether same is used as a hand truck or flat bed truck, a frame pivotally supported at its front end on said base carriage at the forward end of said base carriage so that the frame can be pivoted from an inclined upright to a horizontal position, said base carriage and said frame being so arranged and constructed that at the pivoted support, extension means are provided that position said frame above said base carriage in parallel relation when said frame is pivoted to form said flat bed truck and extending rearwardly of said base carriage said frame having a pair of spaced side members, said members having a series of oppositely facing spaced apertures therealong, means at said free rear end of said frame extending substantially perpendicular to the longitudinal axis of the frame, rollers or wheels at the free end of said perpendicular means below the plane of the spaced side members, a cross member slidably supported on said side members, said cross member having sleeves provided at its opposite ends, said sleeve members each having an aperture alignable with said apertures on said side members, mounted on said cross member locking means for locking said cross member relative to said side members, said locking means including a spring biased locking pin engageable with said alined apertures for selectively locking said frame relative to said base carriage, and bracing means pivotally connected at one end to said base carriage and connected at its free end portion to said cross member for supporting said frame in any adjusted inclined upright position so that said device can serve as a hand truck, said frame being pivotable to a horizontal position with said bracing means positioned horizontally parallel to said frame so that the frame extends horizontally over and parallel to said base carriage with the perpendicular extending means extending rearwardly of said base carriage adjacent the rear end of the frame and with the rollers or wheels at said free end of said perpendicular means resting on the same supporting surface as the rollers or wheels of the base carriage to form a dolly or flat bed truck so that the front and rear wheels or rollers of the base carriage and the wheels or rollers on the rear of the frame all simultaneously support said device when used as a flat bed truck.

2. A hand truck as set forth in claim 1 in which the locking means on the cross member comprises a rotatable handle and a plate fixed to said handle, a pair of locking pins connected to said plate and operated to retracted or extended positions by said plate, with said locking pins extending through said alined apertures in said side members of said frame to lock said cross member to said side members.

3. A hand truck as set forth in claim 1 in which the base carriage has stops at the front thereof which are engaged by the lower end of the front end of the frame to limit the outward tilting or pivoting of the frame relative to the base carriage.

* * * * *

UNITED STATES PATENT OFFICE
CERTIFICATE OF CORRECTION

Patent No. 3,693,996           Dated September 26, 1972

Inventor(s) Joseph Hardy

It is certified that error appears in the above-identified patent and that said Letters Patent are hereby corrected as shown below:

Column 4, line 1, insert a , after "carriage" ;

line 4, "said free" should be changed to --the--;

line 12, before "mounted" insert --locking means--;

line 13, delete "locking means".

Signed and sealed this 13th day of February 1973.

(SEAL)
Attest:

EDWARD M. FLETCHER, JR.          ROBERT GOTTSCHALK
Attesting Officer                 Commissioner of Patents